United States Patent

Oetiker

[11] Patent Number: 5,339,496
[45] Date of Patent: Aug. 23, 1994

[54] SELF-ALIGNING CLAMP STRUCTURE

[75] Inventor: Hans Oetiker, Horgen, Switzerland

[73] Assignee: Hans Oetiker AG Maschinen- und Apparate-fabrik, Switzerland

[21] Appl. No.: 154,374

[22] Filed: Nov. 17, 1993

Related U.S. Application Data

[63] Continuation of Ser. No. 820,246, Jan. 14, 1992, abandoned, which is a continuation-in-part of Ser. No. 922,408, Oct. 23, 1986, abandoned, which is a continuation of Ser. No. 622,764, Jun. 20, 1984, abandoned.

[51] Int. Cl.$^5$ .............................................. B65D 63/02
[52] U.S. Cl. ........................... 24/20 CW; 24/20 R; 24/19
[58] Field of Search .............. 24/20 R, 20 CW, 20 W, 24/23 R, 23 W, 23 EE

[56] References Cited

U.S. PATENT DOCUMENTS

| | | | |
|---|---|---|---|
| 4,299,012 | 11/1981 | Oetiker | 24/19 |
| 5,052,082 | 10/1991 | Uchman | 24/20 CW |
| 5,105,509 | 4/1992 | Lilley | 24/20 CW X |
| 5,177,836 | 1/1993 | Kemmerich | 24/20 CW X |

Primary Examiner—Laurie K. Cranmer
Attorney, Agent, or Firm—Paul M. Craig, Jr.

[57] ABSTRACT

An open self-aligning clamp the overlapping inner and outer band portions of which are adapted to be mechanically connected before tightening about the object to be fastened thereby by a plastically deformable so-called "Oetiker" ear; the mechanical connection includes only two outwardly extending hooks in the inner band portion operable to engage in apertures provided in the outer band portion, whereby one of the hooks is a tab-like guide hook pressed out of the clamping band in a transversely extending plane intersecting the clamping band in the transverse direction while the other hook is a cold-deformed support hook, the inner and outer band portions are reliably guided relatively to one another during tightening of the clamp by a tab-like member pressed out of the inner band portion in such a manner that it extends in the longitudinal direction and can slidably extend within a narrow longitudinal slot in the center area of the outer band portion.

25 Claims, 1 Drawing Sheet

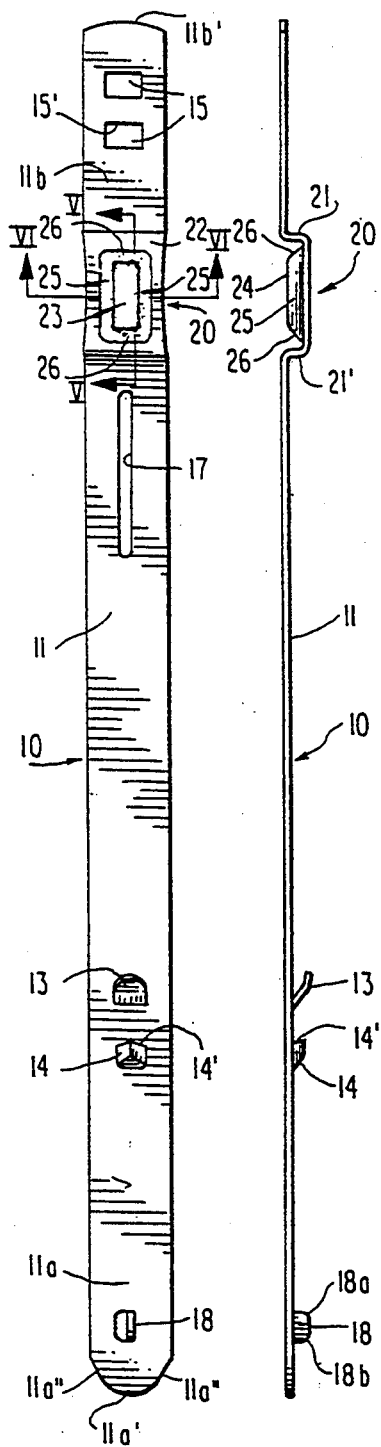
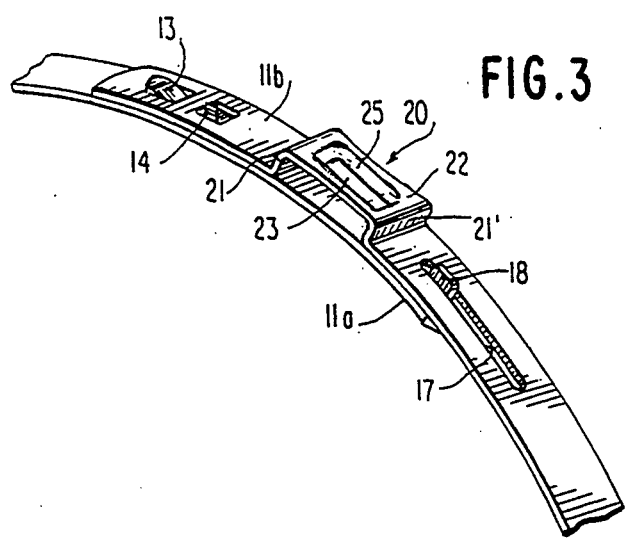
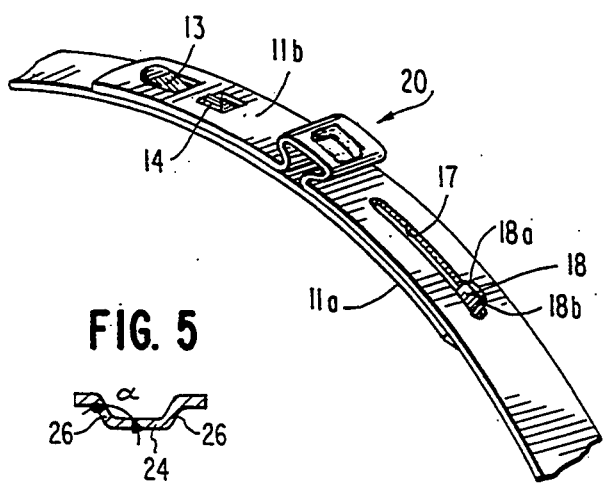
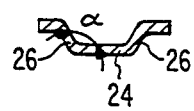
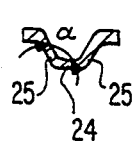

SELF-ALIGNING CLAMP STRUCTURE

RELATED CASES

This is a continuation application of Ser. No. 07/820,246, filed Jan. 14, 1992, now abandoned, which is a continuation-in--part application of my copending application Ser. No. 06/922,408, filed Oct. 23, 1986 and entitled "Deformable Ear For Clamps", now abandoned, which is a continuation application of my then copending application Ser. No. 06/622,764, filed Jun. 20, 1984, now abandoned, as also a continuation-in-part application of my copending application Ser. No. 07/629,716, filed Dec. 18, 1990 and entitled "Reinforced Ear Structure For Clamps."

FIELD OF INVENTION

The present invention relates to an open clamp structure and more particularly to a self-aligning clamp structure for softer materials which is provided with a so-called "Oetiker" ear and which can be manufactured in a cost-effective manner,

BACKGROUND OF THE INVENTION

My prior U.S. Pat. Nos. 4,315,348 and 4,299,012 described a so-called "Stepless" clamp designed for use with relatively thin-walled, relatively hard plastic materials. These prior art clamps have been installed in various applications, the primary use being a leakage-proof tightening of axle boots made from "Hytrell" and similar materials and used in connection with constant velocity joints in the automotive industry. These prior art clamps proved commercially immensely successful as evidenced by sales running into hundreds of millions of such clamps.

Though the use of thermoplastic materials for the previously mentioned applications has increased over the last decade, especially in connection with OEM applications, the uses of materials with a lower Shore hardness such as neoprene and silicon still play a major role in constant velocity (CV) seals, as for example, in the after-market. Furthermore, technological advancements in the formulation of the compounds and the molding techniques of such thermoplastic materials have resulted in more malleable compositions so that the stepless feature does not represent an absolute requisite for all constant velocity applications.

Additionally, intense cost reduction programs by the major automotive manufacturers have resulted in the necessity to provide a product that is more cost-effective than the prior art clamps with the "Stepless" feature, yet is completely satisfactory for CV applications with the soft axle boot materials.

SUMMARY OF THE INVENTION

It is therefore a primary object of the present invention to provide an open clamp structure which assures compliance with the cost reduction programs, yet assures completely satisfactory performance in the applications for which it is intended.

Another object of the present invention resides in an open self-aligning, low-cost clamp which permits a reduction in raw materials as also a reduction in complexity to reduce the demand for statistical process control.

A further object of the present invention resides in a self-aligning clamp structure which can be manufactured in such a manner as to assure improved tool life, thereby reducing the down time for repair and maintenance which in turn permits a reduction of costs.

Still a further object of the present invention resides in a clamp of the type described above which permits improved productivity.

Still another object of the present invention resides in a self-aligning clamp of the type described above which offers design attributes superior to other "generic" clamp products available in the market.

The underlying problems are solved according to the present invention by a clamp which includes a simplified mechanical connection and a so-called plastically deformable "Oetiker" ear with a reinforcement permitting tightening of the clamp with conventional tools, whereby the various parts are so arranged as to permit a reduction in length of the clamping band material required for the clamp of a given size.

According to another feature of the present invention, the configuration of the inner band end according to this invention provides a distinct advantage over conventional end configurations of prior art clamps by lessening the danger of damage to the hose.

Guide arrangements for open clamps are known as such. For example, in my prior German DE-AS 24 58 175, a tongue-like extension at the end of the inner band portion is intended to be guided within a guide slot in the outer band portion. My prior U.S. Pat. No. 4,083,086 describes an upwardly bent tongue at the inner band end which is guided in a slot in the outer band portion. The European Patent EP 0 236 217 describes an outwardly directed T-shaped bent-up part adapted to cooperate with a longitudinal slot. However, whereas the slots in these prior art patents require a certain width, the guide arrangement in accordance with the present invention requires only a narrow slot for engagement by a small outwardly bent tab member extending in the longitudinal direction in the full width end area of the inner band portion. Finally, the German Gebrauchsmuster G 90 15 003.1 discloses a bent-up guide member along the edge of a lateral tongue-like extension of the clamping band adapted to engage in a relatively narrower slot. However, the location of the bent-up guide member along the edge at the end of the tongue-like extension entails other problems in the reliability of operation.

A reinforcing depression of substantially rectangular configuration as viewed in plan view is described in my copending U.S. application Ser. No. 06/922,408, filed Oct. 23, 1986, entitled "Deformable Ear For clamps"; which is a continuation application of my then copending application Ser. No. 06/622,764 filed on Jun. 20, 1984 as also in my copending application Ser. No. 07/629,716, filed Dec. 18, 1990 entitled "Reinforced Ear Structure For Clamps." The clamp, including its reinforcing depression, has been further fine-tuned to assure reliable operation of the clamp for its intended purpose.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on the punched-out blank of a self-aligning clamp structure in accordance with the present invention before deformation into rounded form;

FIG. 2 is a side elevational view of the clamp structure of FIG. 1;

FIG. 3 is a partial perspective view showing the clamp structure of FIGS. 1 and 2 after being deformed into round shape and with the parts thereof in pre-assembled position prior to tightening;

FIG. 4 is a partial perspective view, similar to FIG. 3, showing the various parts in their position after plastic deformation of the ear;

FIG. 5 is a cross-sectional view taken along line V—V of FIG. 1; and

FIG. 6 is a cross-sectional view taken along line VI—VI of FIG. 1.

DETAILED DESCRIPTION OF THE DRAWINGS

Referring now to the drawing wherein like reference numerals are used throughout the various views to designate like parts, the self-aligning clamp structure in accordance with the present invention which is generally designated by reference numeral 10 includes a clamping band 11 made, for example, from galvanized steel or stainless steel clamping band material. The clamping band 11 includes inner and outer end portions 11a and 11b at opposite ends thereof which will overlap when the open clamp is bent into its intended circular shape. The mechanical connection for connecting overlapping band portions includes a single hook-like guide member 13 and a single cold-deformed support member 14 for engagement in rectangular apertures 15 provided in the outer band end portion 11b. The guide member 13 is thereby in the form of a tab-like member bent out of the band material about an axis extending transversely to the longitudinal direction so that the free end of the guide member extends obliquely outwardly in a direction opposite the free end of the inner band portion 11a and the main engaging surface also extends in a plane intersecting the clamping band in the transverse direction. The hook-like guide member 13 may thereby be slightly bent at its outer end as shown in FIG. 1 to facilitate preassembly (FIG. 3). After such pre-assembly, the guide hook 13 may be bent down toward the clamping band to further secure the clamp structure in its preassembled condition. The support member 14 may be a cold-deformed support hook, for example, as disclosed in my prior U.S. Pat. No. 4,299,012 with an abutment surface 14' (FIG. 1) extending transversely and with the remainder of the support member 14 integral with the clamping band over substantially the rest of its contour.

The end of the inner band portion 11a is of more or less parabolic shape formed by the rounded end surface 11a' and the lateral surfaces 11a". The parabola shape of this invention entails the distinct advantage over the commercially available prior art straight or radius-end configurations preventing or at least minimizing the unavoidable damage of the less rigid hose materials by the inner end of the prior art clamps during closing movement of the clamp produced by plastic deformation of the ear and during the resulting reduction in diametric dimension. The parabolic shape in accordance with the present invention significantly improves this condition as it allows the material of the hose or axle boot to flow around the geometrical shape, thereby reducing the plunger action of a straight edge.

The radius in the curved end surface 11b' of the opposite end portion 11b results in an increase in die life due to the absence of intermittent cuts, distinctive of prior art designs. The radius configuration 11b' thereby also reduces the possibility of sharp corners which represented the significant aspect of the chamfers in the prior art clamp designs.

A significant detrimental feature of many commercially available crimp-style clamps is the inability of self-alignment. If the assembly tool is not located precisely at 90° to the edge of the clamping band, the underlying end of the band protrudes from the edge of the clamp, resulting in deviations of the intended circumferential configuration. The self-aligning clamp in accordance with the present invention overcomes this drawback by incorporating a narrow slot 17 in the center area of the outer band portion. A protruding tab-like member 18 which is punched-out and bent at right angle with respect to the plane of the clamping band so as to extend outwardly substantially in the longitudinal center plane, is adapted to engage in the narrow slot 17 and thereby guides the clamp during the closing operation. The slot 17 can thereby be made relatively narrow, for example, may have a width of only about 1.2 mm. as it only needs to permit the tab-like member having a thickness corresponding to the thickness of the clamping band to extend therethrough. This guidance arrangement assures a symmetrical and uniform closure of the clamp. At the same time, the narrow slot 17 does not materially weaken the clamping band and can be located close enough to the plastically deformable so-called "Oetiker" ear generally designated by reference numeral 20 as to reduce the amount of band material required for a given clamp size. The "Oetiker" ear 20 includes two generally outwardly extending leg portions 21 and 21' interconnecting the ear with the overlapping outer band portion 11b. The generally outwardly extending leg portions 21 and 21' are interconnected by a bridging portion 22 extending in the longitudinal direction of the clamp. The bridging portion 22 is thereby provided with reinforcing means in the form of a shallow depression 23 which may be constructed as described in my aforementioned copending applications, the subject matter of which is incorporated herein by reference. To achieve the desired holding ability of the ear 20 for the intended applications, the depression 23 of this invention is thereby of generally rectangular configuration with the longitudinal sides and the transverse sides thereof extending at least approximately parallel to one another. The corners between the longitudinal and transverse sides of the generally rectangular depression 23 are preferably rounded off utilizing small radii of curvature which may be constant or vary in a given area. These radii of curvature are chosen in such a manner as to minimize impacting on the rectangular configuration of the depression 23 yet avoid problems that might be caused by sharp connecting corners. The bottom 24 (FIG. 2) of the shallow reinforcing depression 23 is thereby generally flat in both the longitudinal and transverse directions. However, the bottom 24 may also have a slight concave curvature in the longitudinal direction with a radius of curvature of about 5 mm. The bottom 24 is interconnected with the remaining non-depressed parts of the bridging portion surrounding the depression 23 by way of longitudinally extending connecting portions 25 and transversely extending connecting portions 26. Again, to avoid sharp corners, the transition of the longitudinally extending connecting portions 25 and of the transversely extending connecting portions 26 with the bottom 24 and the remaining non-depressed parts of the bridging portion 22, are rounded-off utilizing small radii of curvature which may be constant or may vary in a given area. These radii of curvature are thereby chosen so as to impact as little as possible on the general configurations of the area of the bottom 24 and the remaining non-depressed parts of the bridging portion 22. In a preferred embodiment, these radii of curvature are about 2 mm. The angled subtended by the longitudinally and transversely extending connecting portions 25 and 26 with the plane containing the bottom 24 and the remaining non-depressed parts of the bridging portion, is between about 90° and about 110°, preferably about 90° to 98°. The angles formed by the longitudinal connecting portions 25 and the transverse connecting portions 26 may be substantially identical or may also be different having values falling within the above-indicated ranges. The area of the reinforcing depression, measured in the plane of the bridging portion 22 is about 30% to about 55% of the total area of the bridging portion 22 and is preferably about 40% to 45% of the total area of the bridging portion in its non-reinforced condition, i.e., before the depression is made. The reinforcing depression 23 thus resembles a shallow pan-shaped configuration as found, for example, with Pyrex-type cooking pans of rectangular configuration and relatively shallow depth as compared to other cooking pans.

By omitting the tongue-like extension of the inner band portion and the tongue-receiving channel in the outer band portion which were necessary to achieve the stepless feature in my prior U.S. Pat. No. 4,299,012, the dimensional controls, previously necessary to assure compliance with the design of the clamp in accordance with my prior U.S. Pat. No. 4,299,012, could be dramatically reduced. This omission is quite acceptable as the intended application of the clamp in accordance with the present invention compensates for any irregularities along the inner circumference.

In addition to the particular configuration of the rounded end 11b' and of the parabolically shaped end 11a', 11a" in the outer and inner band portions 11b and 11a, improved tool life which reduces "down time" for repair and maintenance and therewith reduces manufacturing costs, is also achieved by the particular configuration of the tab-like member 18 which has rounded corners 18a and 18b realized by the particular cut in the clamping band shown in FIG. 1. A reduction in necessary band material is attainable by omitting a third hook-like connecting member and the necessary aperture which would be required therefor. Additionally, by locating the tab-like member 18 in the end area of the band portion 11a where the latter commences to converge into parabolic form and by extending the slot 17 close to the leg portion 21', which is made possible by the narrow width for this slot, clamping band material can be further economized. As these clamps are expected to be sold by the millions, even a few millimeters in required band length affect the cost thereof.

OPERATION

To install the clamp over the object to be fastened thereby such as a hose or axle boot, the clamp is preformed into circular shape so that the hook-like connecting members 13 and 14 can engage in apertures 15. This preforming may take place at the manufacturer of the clamps in which case the tab-like member 13 may also be additionally bent down after preassembly to increase the holding ability of the clamp in its preassembled condition. Additionally or in the alternative, the tab-like member 18 can also be bent over at its outwardly protruding end to thereby preclude its undesired escape from slot 17. In the alternative, the clamps can be supplied in their elongated condition as shown in FIGS. 1 and 2 which greatly reduces the shipping costs and can then be predeformed at the place of installation of the clamp, for example, by the use of a machine as disclosed in my prior U.S. Pat. No. 4,425,781 or in my prior U.S. Pat. No. 4,633,698. The preformed and preassembled clamp (FIG. 3) can then be axially mounted over the object to be fastened. In the alternative, it can also be radially mounted over the object to be fastened by slightly reopening the clamp, slipping it radially over the object to be fastened and then engaging hook-like connecting members 13 and 14 in apertures 15. To tighten the clamp, the plastically deformable ear 20 is then deformed by the use of a conventional pincer-like tools. As the ear 20 is plastically deformed, the tab-like guide member 13 will guide the inner and outer band portions 11a and 11b toward one another until the support hook 14 is able to engage with its abutment surface at the transversely extending end 15' of the aperture 15. The resulting plastically deformed ear of more or less omega shape is shown in FIG. 4. During the tightening of the clamp by plastic deformation of the ear 20, the overlapping band portions are securely guided relative to one another by the tab member 18 guided within slot 17.

The clamp in accordance with the present invention offers significant advantages as regards requirements of raw material, tool life and productivity, all of which can be significantly improved by the present invention. Additionally, the demand for statistical process control can be significantly reduced by a reduction of the complexity of the clamp itself. All of these advantages can be attained by the clamp in accordance with the present invention which represents a combination of specific features that contribute to the overall performance of the clamp. Moreover, though the clamp of the present invention omits features previously found in so-called "Stepless" clamps, it maintains a high reliability in operation for the intended applications. Additionally, the self-aligning clamp in accordance with the present invention will satisfy the requirements for greater cost effectiveness without impairing its adequacy in operation.

While I have shown and described only one embodiment in accordance with the present invention, it is understood that the same is not limited thereto but is susceptible of numerous changes and modifications as known to those skilled in the art. For example, in lieu of guide hook 13, a combined guide and support hook as disclosed in my prior U.S. Pat. No. 4,622,720 may be used. Such a single or two combined guide and support hooks may also be used in some applications for the two hooks 13 and 14 as disclosed herein. I therefore do not wish to be limited to the details shown and described herein but intend to cover all such changes and modifications as are encompassed by the scope of the appended claims.

I claim:

1. A self-aligning, cost-effective clamp structure, comprising clamping band means having inner and outer band portions of full band width and having center areas, connecting means for connecting overlapping inner and outer band portions, tightening means including at least one plastically deformable ear means for tightening the clamp about an object to be fastened thereby, and guide means for guiding overlapping inner and outer band portions during tightening of the clamp structure, said connecting means including only two hook means outwardly extending from the inner band portion and operable to engage in apertures provided therefor in the outer band portion, one of said hook means being a tab-like member pressed out of the clamping band in a transversely extending plane intersecting the clamping band in the transverse direction thereof, and the other hook means being a cold-deformed support hook, the plastically deformable ear means including two generally outwardly extending leg portions interconnected by a bridging portion, and the guide means including a narrow longitudinal slot in the center area of the outer band portion and a tab-like member pressed out of the end area of the full band width inner band portion in such a manner that it extends outwardly in the longitudinal direction and can slidably extend within said slot whereby the presence of only two hook means and the location of the tab-like member permit a reduction in the clamping band material required for the clamp structure.

2. A clamp structure according to claim 1, wherein said tab-like member forming part of the guide means extends longitudinally in a plane which intersects the clamping band in the longitudinal direction thereof at an angle approximately 90° so that the width of the narrow slot is only slightly larger than the thickness of the clamping band material.

3. A clamp structure according to claim 2, wherein the slot has an end nearer the ear means which extends to a point located in the outer band portion in proximity of the adjacent, outwardly extending leg portion.

4. A clamp structure according to claim 2, wherein the tab-like member of the guide means is located in the inner band portion within its end area having a full band width.

5. A clamp structure according to claim 2, wherein the outwardly extending tab-like member of the guide means has rounded-off corners, as viewed in side view of the clamp.

6. A clamp structure according to claim 5, wherein the slot has an end nearer the ear means which extends to a point located in the outer band portion in proximity of the adjacent, outwardly extending leg portion.

7. A clamp structure according to claim 5, wherein the outer band portion has an end surface with a convexly shaped radial configuration avoiding sharp corners.

8. A clamp structure according to claim 7, wherein the inner band portion has end surfaces which are, at least, of approximately parabola-like shape.

9. A clamp structure according to claim 8, wherein the reinforcing means is formed by shallow pan-shaped depression means of generally rectangular configuration as viewed in plan view.

10. A clamp structure according to claim 9, wherein the depression means is surrounded on all sides by remaining non-depressed parts of the bridging portion and wherein the area of the depression means is at least about 30% of the total area of the bridging portion in its non-reinforced condition.

11. A clamp structure according to claim 9, wherein the depression means has bottom means and longitudinally as well as transversely extending connecting portions connecting the bottom means with the remaining non-depressed parts of the bridging portion, and wherein at least the longitudinally extending connecting portions extend substantially parallel to one another over substantially their entire length.

12. A clamp structure according to claim 11, wherein the transversely extending connecting portions extend substantially parallel to one another over substantially their entire length.

13. A clamp structure according to claim 12, wherein said depression means is in the shape of a rectangle with its corners rounded-off.

14. A clamp structure according to claim 13, wherein the connecting portions pass over into the bottom means and the remaining non-depressed parts of the bridging portion by way of rounded-off corners having small radii of curvature.

15. A clamp structure according to claim 14, wherein said bottom means is substantially flat in at least one of the longitudinal and transverse directions.

16. A clamp structure according to claim 15, wherein said connecting portions subtend an angle with the plane containing the bottom means and the plane containing the remaining non-depressed parts of the bridging portion which is about 90° to about 110°.

17. A clamp structure according to claim 1, wherein the inner band portion has end surfaces which are of, at least, of approximately parabola-like shape.

18. A clamp structure according to claim 17, wherein the outer band portion has an end surface which is a convexly shaped radial configuration avoiding sharp corners.

19. A clamp structure according to claim 18, wherein the outwardly extending tab-like member of the guide means has rounded-off corners, as viewed in side view of the clamp.

20. A clamp structure according to claim 1, wherein the reinforcing means is formed by shallow pan-shaped depression means of generally rectangular configuration as viewed in plan view, the depression means is surrounded on all sides by remaining non-depressed parts of the bridging portion and wherein the area of the depression means is at least about 30% of the total area of the bridging portion in its non-reinforced condition, said depression means having bottom means and longitudinally as well as transversely extending connecting portions connecting the bottom means with the remaining non-depressed parts of the bridging portion, and wherein the longitudinally and transversely extending connecting portions extend, at least, approximately parallel to one another over substantially their entire length.

21. A clamp structure according to claim 20, wherein the connecting portions pass over into the bottom means and the remaining non-depressed parts of the bridging portion by way of rounded-off corners having small radii of curvature, wherein said bottom means is substantially flat in at least the transverse direction, and wherein said connecting portions subtend an angle with the plane containing the bottom means and the plane containing the remaining non-depressed parts of the bridging portion which is about 90° to about 110°.

22. A self-aligning, cost-effective clamp structure, comprising clamping band means having full band width inner and outer band portions with center areas, connecting means for connecting overlapping inner and outer band portions, tightening means including at least one plastically deformable ear means for tightening the clamp about a hose-like object to be fastened thereby, and guide means for guiding overlapping inner and outer band portions during tightening of the clamp structure, said connecting means including at most two hook means outwardly extending from the inner band portion and operable to engage in apertures provided therefor in the outer band portion, the plastically deformable ear means including two generally outwardly extending leg portions interconnected by a bridging portion, the guide means including a narrow longitudinal slot in the center area of the outer band portion and a tab-like member pressed out of the center area of the full band width inner band end portion in such a manner that it extends in the longitudinal direction and can slidably extend within said slot, and means including end surface means at the free end of the inner band portion to minimize damage to the underlying hose-like object during relative sliding movement of the inner band portion in the course of a tightening operation whereby the presence of at most two hook means and the location of the tab-like member permit a reduction in the clamping band material required for the clamp structure.

23. A clamp structure according to claim 22, wherein the end surface means of the inner band portion are, at least, of approximately parabola-like shape.

24. A clamp structure according to claim 23, wherein said tab-like member as also the outer band portion at its free end have rounded-off corners to increase tool life.

25. A clamp structure according to claim 22, wherein said tab-like member as also the outer band portion at its free end have rounded-off corners to increase tool life.

* * * * *